Figure 1:
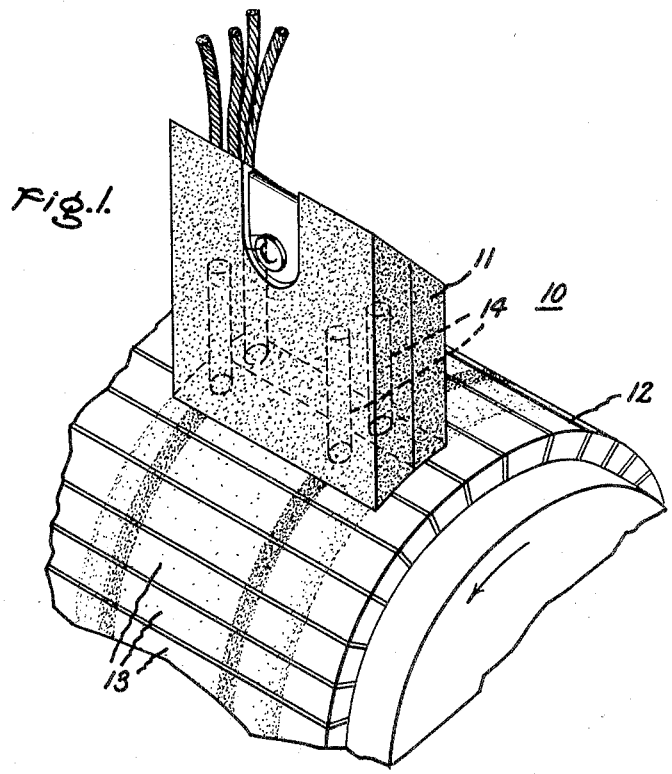

March 9, 1965

C. S. OLIVER ETAL 3,173,045

ELECTRIC CURRENT COLLECTION AND DELIVERY
APPARATUS FOR DYNAMOELECTRIC MACHINE
Filed March 23, 1960

Inventors:
Curtis S. Oliver,
Arthur J. Haltner,
by James J. Lichiello
Their Attorney.

United States Patent Office 3,173,045
Patented Mar. 9, 1965

3,173,045
ELECTRIC CURRENT COLLECTION AND DELIVERY APPARATUS FOR DYNAMOELECTRIC MACHINE
Curtis S. Oliver and Arthur J. Haltner, Schenectady, N.Y., assignors to General Electric Company, a corporation of New York
Filed Mar. 23, 1960, Ser. No. 19,979
9 Claims. (Cl. 310—228)

This invention relates to commutation and collection of current in electrical devices, such as for example, motors and generators, and more particularly, to brushes utilized in the above-described apparatus and containing an improved lubricant material. This application is a continuation-in-part of copending application Serial No. 830,483—Oliver et al., filed July 30, 1959, now abandoned and assigned to the same assignee as the present invention.

Contact brushes for collecting and delivering electrical current are generally and predominantly carbon or graphite. Experience has demonstrated that ordinary carbonaceous brushes rapidly fail due to excessive wear when operating under conditions of high altitude and low humidity. Rapid wear of carbon brushes also occurs under other conditions of extremely low humidity, such as at sub-zero temperatures at low altitudes. Excessive brush wear has constituted a problem in the development of aircraft power equipment, for example, for extreme high altitude and high speed operations.

In some instances, pores or interstices of carbonaceous brushes have been impregnated or treated with film forming compounds or have had such compounds incorporated either within or without their structure during manufacture. Brushes containing various impregnants or additives when operated under the adverse atmospheric conditions have been subjected to less intense wear but yet operate with impaired efficiency when compared with a standard carbon or graphitic brush operating in the presence of an adequate vapor pressure. Some of these difficulties were caused by over-filming by reason of the deposition of the lubricating material or additive as a smear on the rubbing surface of the commutator or other current transferring device. This deleterious effect may be further intensified by spasmodic local evaporation and condensaion at restricted areas of intense heating. As a consequence, excessive contact resistance occurs accompanied by sparking, commutator roughening, accelerated wear, and overheating of the apparatus.

Efforts extending over many years have been made to overcome excessive wear of electric brushes when in sliding contact with rapidly moving metal surfaces. Attempts have been made to solve the problem by incorporating various compounds into the dynamoelectric brushes. In general, however, the deposition or film formation of a lubricant on the commutator or ring is excessive when the rate of supply of lubricant is proportioned to be sufficient to cause the brush to function properly.

Accordingly, it is an object of this invention to provide an improved current carrying brush.

It is another object of this invention to provide an improved current carrying brush incorporating a dry lubricant.

It is yet another object of this invention to combine an additive with a lubricant, for current conveying brushes, to provide an improved lubricant film.

It is still another object of this invention to provide a lubricant for current conveying brushes and the like which maintains lubricant film at a minimum thickness.

It is yet another object of this invention to provide an improved lubricant for current conveying brushes to form an improved film having good bearing and good current conducting qualities.

Figure 2:
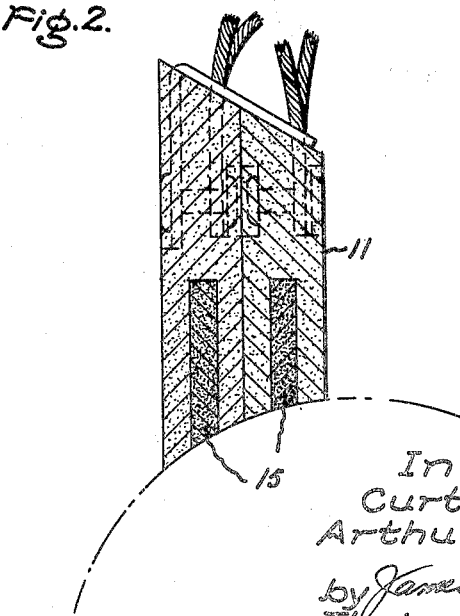

This invention will be better understood when taken in connection with the following description and the drawings in which;

FIG. 1 is a three dimensional view of a brush, including lubricant inserts, and a partial section of a commutator; and FIG. 2 is a modification of the brush inserts of FIG. 1.

In copending application Serial No. 19,978—Oliver et al. (now issued as U.S. Patent 3,127,346), filed concurrently herewith and assigned to the same assignee as the present invention, there is disclosed an improved dry lubricant material. This dry lubricant material concerns certain inorganic compounds, i.e., the sulfides, disulfides, selenides, and tellurides, of such metals as molybdenum, tungsten, titanium, zirconium, uranium, etc., which are characterized by a laminated or plate-like crystal structure in which the metallic atoms are arranged in a single common plane while the non-metallic atoms are attached to the metallic atoms to form layers on both sides of this plane. The non-metallic atoms in each of the crystals in the sandwich structure have very little attraction for each other so that these crystals will slip readily with respect to each other under the action of low shearing forces. Moreover, the non-metallic atoms have an affinity for adjacent metal surfaces so that the crystals attached to such surfaces will exhibit very strong resistance to the action of forces normal to the direction of shear. Consequently, these compounds have excellent lubricating properties and also have excellent anti-seizing properties. These lubricants will be hereinafter referred to as "lamellar metal compound lubricants." Most promising of these lubricants are molybdenum disulfide ($MoS_2$) and tungsten disulfide ($WS_2$). It has been found, however, that $MoS_2$ and $WS_2$ more particularly, have pronounced disadvantages as dry lubricants, including, first, that they have high wear rate and thus wear quite rapidly with continual replenishment being necessary, second, as the lubricant wears, large amounts of the material are accumulated in moving surfaces and may in some instances cause jamming or other undesirable effect. Furthermore, these lubricants have poor load carrying ability and their use is thereby restricted to light application. When binders are employed, the disadvantages may be magnified and/or the binder becomes a limiting factor. However, as stated in the aforementioned patent, the subject matter which is incorporated by reference herewith, certain additives have been discovered to greatly improve the characteristics of not only the lamellar metal compounds generally, but more particularly to $MoS_2$ and $WS_2$. A listing of these additives are given in the following table:

TABLE I

Additives

| | |
|---|---|
| $Sb_2S_5$ | CuS |
| PtS | $Au_2S$ |
| HgS (red) | $Bi_2S_3$ |
| $Ag_2S$ | S |
| PbS | $SnS_2$ |
| FeS | HgS (black) |
| $Ti_2S_3$ | $Tl_2S_3$ |
| $Cu_2S$ | $Cr_2S_3$ |

It is understood that various compositions which decompose or react to form, additives of Table I and II, or sulfide additives of less thermodynamic stability than the parent lubricant and/or the surface material, may also be employed.

Many tests were performed with the above additives in combination with lamellar metal compounds. These tests generally included rubbing a film of the compound-additive combination on a metal surface and thereafter employing a small weighted steel sphere to slide over the film. Coefficient of friction was measured between the sphere and surface. For example, those additives in column 1, when combined with MoS₂, indicated a coefficient of friction from 0.038 to 0.06 on a mild steel surface, with loadings from about 2.5 to 6 kg. Sampling of these additives when combined with WS₂ indicated a coefficient of friction of about 0.025 to 0.035 on mild steel under a load of 5 to 8 kg.

The subject matter of the aforementioned U.S. Patent 3,127,346 is incorporated in this application by reference. The dry lubricant as described and as existing in the aforementioned application provides an extremely improved wear resisting and load carrying lubricant film for bearing surfaces. This film is of a minimal thickness and only a minimal buildup occurs during long periods of operation, thus avoiding jamming of the moving bearing parts by the accumulation of excessive material therebetween. Such a lubricant material is particularly adaptable not only for bearing materials but also for current collecting devices, such as brushes and the like. It is generally well known in the art to utilize the lamellar metal compound lubricants, particularly molybdenum disulfide as a lubricant in electrical brushes whether the lubricant is incorporated within the brush itself, such as by dispersion, or whether the lubricant is in an integral solid form within the brush, or associated with but external to the brush. However, it is highly desirable that the lamellar metal compound lubricants generally, and the most promising, $MoS_2$ and $WS_2$, be employed as dry lubricants because of their advantageous lubrication characteristics.

It has been discovered, that in using the lubricants of the aforementioned copending application, the above-described problems are generally overcome or minimized to a considerable extent, such that an improved brush is obtained when utilizing, for example, $MoS_2$ in conjunction with an additive. It has also been discovered that when employing a lubricant film of $MoS_2$ together with prescribed additives, there is provided a film of greatly improved durability, lower wear rate, less buildup of the lubricant layer on a commutator surface and increased life of carbon brushes. When this invention is applied to a common current conveying brush moving over a copper commutator, it has been found that a preferred concentration for the additive is to be from about 2 to about 5% by weight of the $MoS_2$, although lesser and greater quantities provide good results.

The following Table II illustrates select additives in combination with $MoS_2$ which substantially decrease lubricant wear rate.

TABLE II

*Frictional behavior of $MoS_2$ and various sulfide additives on copper*

| Additive | Conc., percent by weight | μ | Wear Rate, mg./hr. |
|---|---|---|---|
| None | | .17 | 27.5 |
| SnS₂ | 10 | .18 | 4.0 |
| SnS₂ | 20 | .17 | 5.5 |
| Sb₂S₅ | 10 | .16 | 4.1 |
| Sb₂S₅ | 5 | .16 | 6.0 |
| Sb₂S₅ | 5 | .16 | 8.1 |
| CaS | 10 | .16 | 2.4 |
| BaS | 10 | .24 | 13.0 |
| CdS | 10 | .20 | 3.5 |
| CdS | 10 | .22 | 0.8 |
| Cr₂S₃ | 10 | .21 | 4.5 |
| Cr₂S₃ | 20 | .23 | 1.5 |
| Cr₂S₃ | 5 | .23 | 2.5 |
| Ag₂S | 10 | .15 | 5.5 |
| Bi₂S₃ | 10 | .17 | 3.5 |

The incorporation of, for example, an $MoS_2$ plus additive combination with carbon brushes may be accomplished by means well known in the art. For example, the $MoS_2$ and additive combination may be dispersed throughout the brush, or may be utilized as elements, for example, cores, inserts, large particles, etc. Alternatively, the $MoS_2$ additive combination may be positioned without the brush proper to provide a film on the commutator, for example, over which the brush moves. On the other hand, it is contemplated that, as in the case of bearing materials, the $MoS_2$ additive combination may be applied as a film directly to the commutator.

Referring now to FIG. 1, there is illustrated a well known type of brush assembly or apparatus 10 including a brush 11 and a commutator 12. The operation of this assembly is of such common knowledge to those skilled in the art that no elaborate description is warranted. Brush 11 is in sliding contact with commutator 10 along the commutator bars 13 and, therefore, wear occurs at the contact surfaces. The lubricant of this invention is particularly adaptable to be incorporated in brush 11 in the form of inserts 14 or other and various configurations including dispersed chunks, cores, etc. It is understood that these inserts may be positioned in the brush 10 in various or particular positions to provide different film tracks. Broadly speaking, inserts may be generally incorporated with the apparatus to provide, in all instances, a film of lubricant between the contact surfaces. Inserts 14 wear away or provide a film proportioned to the wearing of the brush 11, and the film being formed provides lubrication for brush 14 to limit wear. FIG. 2 discloses a modification whereby inserts 15 are in rectangular form to provide a wider film for the contact surfaces. A more complete description of an exemplary application similar to that as described may be found in U.S. Patent No. 2,736,830—Savage, assigned to the same assignee as the present invention.

It can thus be seen that the objects of our invention are obtained in current collecting devices by providing a film between, for example, a brush and a commutator which film is composed of generally a lamellar metal compound and a preferred percentage prescribed additives to provide an improved and durable film.

The amount by weight of additive may vary for particular circumstances. For example, considering wear rate, only a small percentage is necessary since a progressively higher wear rate is encountered when the amount of additive increases over that amount providing a minimum wear rate. Generally, a positive amount from about 0 to 50% by weight provides a reduced wear rate from a minimum wear rate at about 2% and increasing at 50%. The wear rate at 50% additive, however, is still lower than $MoS_2$ alone.

While other modifications of this invention and variations thereof which may be employed in the scope of the invention have not been described, the invention is intended to include all such as may be embraced within the following claims.

What we claim as new and desire to secure by Letters Patent of the United States is:

1. A current conveying apparatus comprising in combination a commutator, an electrical brush in sliding contact with said commutator, and means providing a dry lubricant film between said brush and said commutator, said film comprising a mixture of at least one lamellar metal compound lubricant chosen from the group consisting of $MoS_2$, $WS_2$, $ZrS_2$ and $TiS_2$ with at least one additive chosen from the group consisting of $Sb_2S_5$, PtS, red HgS, $Ag_2S$, PbS, FeS, $Ti_2S_{33}$, $Cu_2S$, CuS, $Au_2S$, $Bi_2S_3$, S $SnS_2$, black HgS, $Tl_2S_3$, $Cr_2S_3$, CaS, BaS and CdS, wherein the additive content is in the range of from a small amount to about 50% by weight of the lamellar metal compound lubricant, said small amount being sufficient to be effective in reducing the wear rate of the lamellar metal compound lubricant.

2. The current conveying apparatus as recited in claim 1 wherein the lamellar metal compound lubricant is $WS_2$.

3. The current conveying apparatus as recited in claim 1 wherein the lamellar metal compound lubricant is $MoS_2$.

4. The current conveying apparatus as recited in claim 1 wherein the additive comprises in the range of from at least about 2 to 5% of the weight of said film.

5. In a current conveying brush, the combination comprising, a carbonaceous body, and a dry lubricant incorporated therewith, said lubricant comprising a mixture of at least one lamellar metal compound lubricant chosen from the group consisting of $MoS_2$, $WS_2$, $ZrS_2$ and $TiS_2$ with at least one additive chosen from the group consisting of $Sb_2S_5$, $PtS$, red $HgS$, $Ag_2S$, $PbS$, $FeS$, $Ti_2S_3$, $Cu_2S$, $CuS$, $Au_2S$, $Bi_2S_3$, $S$, $SnS_2$, black $HgS$, $Tl_2S_3$, $Cr_2S_3$, $CaS$, $BaS$ and $CdS$, wherein the additive content is in the range of from a small amount to about 50% by weight of the lamellar metal compound lubricant, said small amount being sufficient to be effective in reducing the wear rate of the lamellar metal compound lubricant.

6. In a current conveying brush, the combination comprising, a carbonaceous body, an insert of a dry lubricant material in said body, said lubricant material comprising a mixture of at least one lamellar metal compound lubricant chosen from the group consisting of $MoS_2$, $WS_2$, $ZrS_2$ and $TiS_2$ with at least one additive chosen from the group consisting of $Sb_2S_5$, $PtS$, red $HgS$, $Ag_2S$, $PbS$, $FeS$, $Ti_2S_3$, $Cu_2S$, $CuS$, $Au_2S$, $Bi_2S_3$, $S$, $SnS_2$, black $HgS$, $Tl_2S_3$, $Cr_2S_3$, $CaS$, $BaS$ and $CdS$, wherein the additive content is in the range of from a small amount to about 50% by weight of the lamellar metal compound lubricant, said small amount being sufficient to be effective in reducing the wear rate of the lamellar metal compound lubricant.

7. The current conveying brush as recited in claim 6 wherein the lamellar metal compound lubricant is $MoS_2$.

8. The current conveying brush as claimed in claim 5 wherein the lamellar metal compound lubricant is $WS_2$.

9. The current conveying brush as claimed in claim 5 wherein the lamellar metal compound lubricant is $MoS_2$.

References Cited by the Examiner
UNITED STATES PATENTS

| | | | |
|---|---|---|---|
| 2,414,543 | 1/47 | Moberly | 310—228 |
| 2,421,543 | 6/47 | Cook | 252—25 |
| 2,736,830 | 2/56 | Savage | 310—251 |
| 2,777,081 | 1/57 | Miner | 310—228 |
| 3,127,346 | 3/64 | Oliver et al. | 252—25 |

MILTON O. HIRSHFIELD, *Primary Examiner.*

ORIS L. RADER, *Examiner.*